March 1, 1966
G. P. SAVKO
3,238,346
APPARATUS FOR MAKING JOINT BETWEEN THERMO PLASTIC PIPE AND FITTINGS THEREOF
Filed Aug. 5, 1963
3 Sheets-Sheet 1
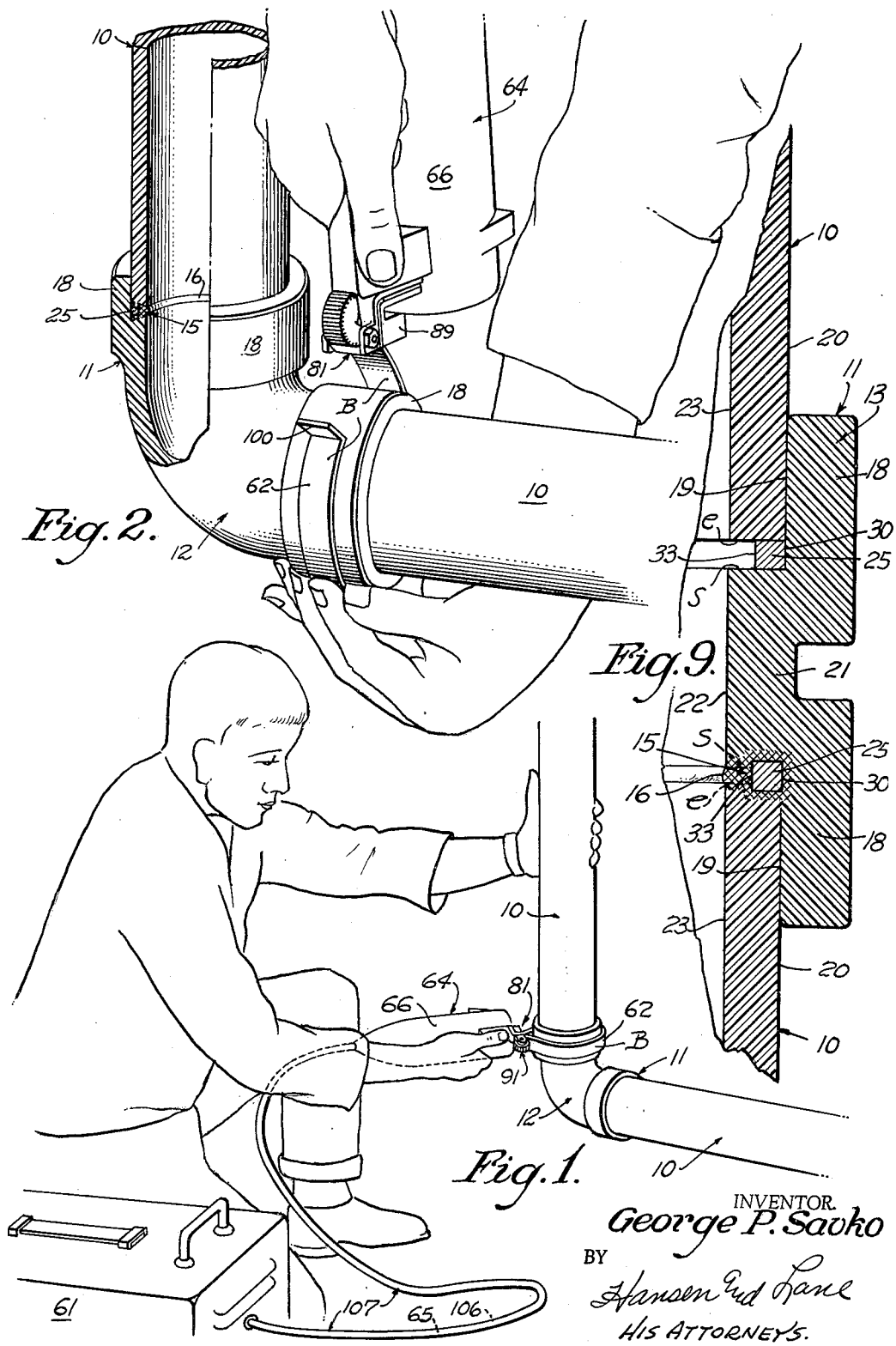
INVENTOR.
George P. Savko
BY
Hansen and Lane
HIS ATTORNEYS.

March 1, 1966
G. P. SAVKO
3,238,346
APPARATUS FOR MAKING JOINT BETWEEN THERMO
PLASTIC PIPE AND FITTINGS THEREOF
Filed Aug. 5, 1963
3 Sheets-Sheet 2
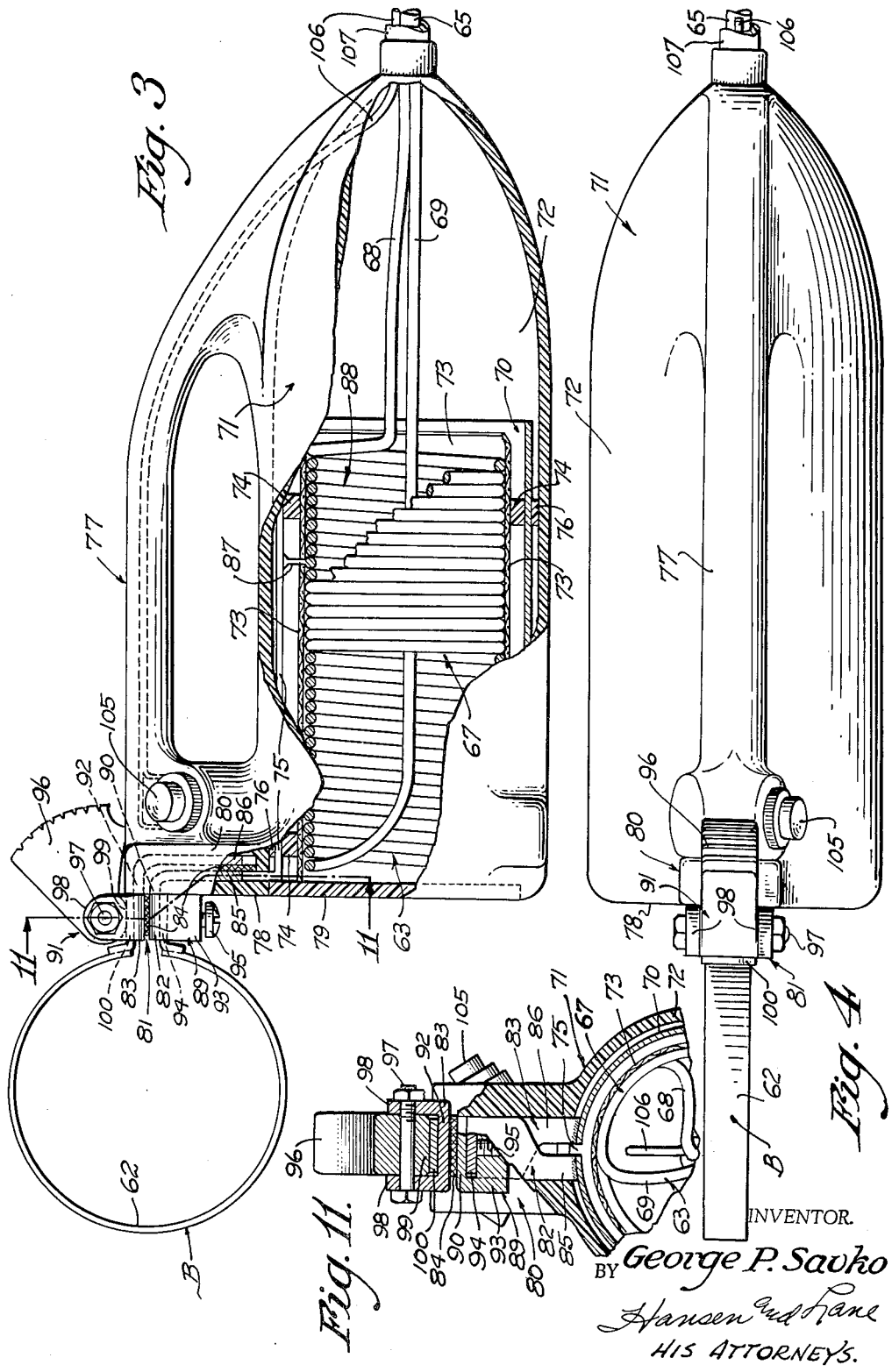
INVENTOR.
George P. Savko
BY Hansen and Lane
HIS ATTORNEYS.

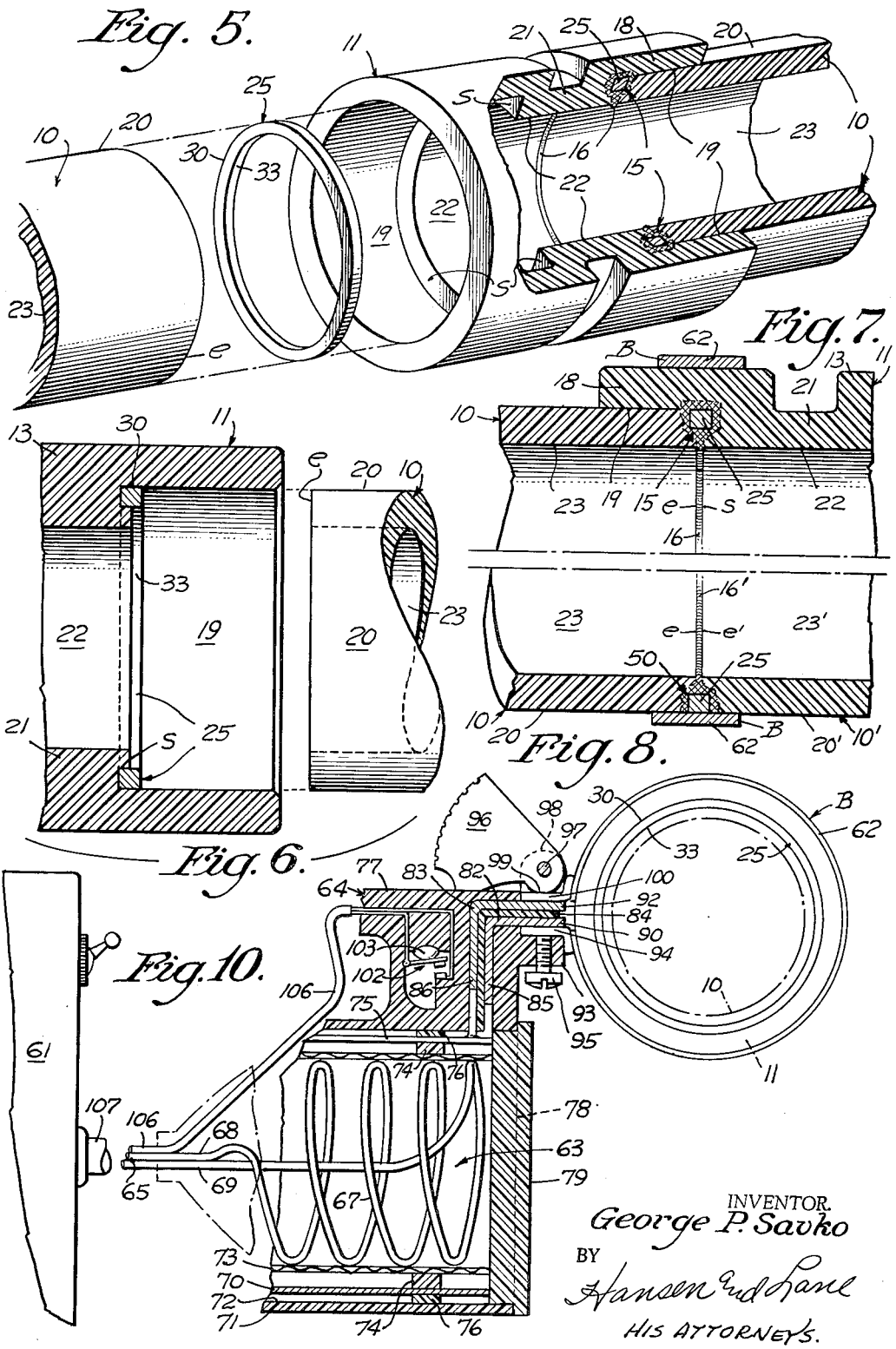

United States Patent Office 3,238,346
Patented Mar. 1, 1966

3,238,346
APPARATUS FOR MAKING JOINT BETWEEN THERMO PLASTIC PIPE AND FITTINGS THEREOF
George P. Savko, 1051 Bernardo Ave., Sunnyvale, Calif.
Filed Aug. 5, 1963, Ser. No. 299,926
8 Claims. (Cl. 219—10.53)

This invention relates to a sealed joint of thermo plastic pipe and tubing and to the apparatus for making the same.

The present invention was conceived to overcome the problems encountered in the installation of plastic pipe and fittings in laboratories and institutions where acids and other destructive substances are used.

Polypropylene pipe and fittings have come to be extensively used for plumbing in electronic laboratories. In the electronic industry today acids of all kinds are used for making printed circuits.

As a result of the use of great quantities of acids it has become necessary to use pipe and fittings made of materials which are resistant to the highly destructive action of acids.

Polypropylene pipe and fittings cannot be adequately joined by threading or threaded and flared fittings as has been the practice with iron, steel and copper pipe and fittings. In order to accomplish a leak proof joint in polypropylene pipe and fittings, especially wherein acids are to flow, all joints have to be welded. Welding of thermo plastics is not new. Various devices have been created for joining plastics such as polypropylene by means of a flame from a torch and the use of welding rod of a like material to that to be welded. All such welds have to be hand made. In some cases ends of pipe to be welded have been placed in heating elements and heated simultaneously before being brought together by hand at the precise moment of fusion. Here again, the human element and possibility of misalignment of pipe ends results in rendering joints made in this manner faulty. Once such a weld has been made it is impossible to disassemble the faulty joint and to re-weld the same. In such cases it is necessary to cut out the faulty joints and create new ones thus doubling the time, cost and material factors binarily.

It is an object of the present invention to provide apparatus for making a simple joint in thermo plastic pipe having an inexpensive heatable element therein. In this connection it is another object to provide a sealed joint between abutting ends of thermo plastic tubing.

It is another object to provide a quick connectable apparatus for making a sealed joint between two abutting ends or surfaces of thermo plastic pipe and/or fittings and a heating ring interposed between said surfaces.

It is another object to provide a simple yet effective apparatus for making such a joint in which a ring of metal having a high inductive pick-up disposed between ends of tubing to be welded is inductively heated means externally of the tubing until the plastic material becomes molten and fused.

It is yet another object to provide a heat induction generator with a transformer head remote from a radio frequency oscillator. In this connection it is an object to provide a hand type easily mobile head for the induction generator whereby to create heat in the heatable element forming a part of the sealed joint in thermo plastic pipes and fittings.

It is another object to provide a remote induction generator head with a loop disposed for ready attachment to various sizes of pipes and fittings. With this in mind it is a further object to provide means for quickly opening and closing the loop about the area of pipes and fittings about to be joined.

It is another object to provide such an induction generator head with a remote control wired to a radio frequency oscillator by flexible cables to facilitate operation of the head without moving the oscillator about.

These and other objects and advantages of the present invention for an apparatus for making the joint will become apparent from a reading of the following description in the light of the drawings in which:

FIG. 1 is a perspective view of a pipe and a fitting being welded and the remote head of the apparatus for creating heat by induction to accomplish the weld.

FIG. 2 is a perspective view showing in partial section the weld joint completed in FIG. 1 and the apparatus being applied to the other end of the fitting for making a joint with another length of pipe.

FIG. 3 is a side elevation of the welding head of FIGS. 1 and 2 with parts broken away for purposes of illustration.

FIG. 4 is a top plan view of FIG. 3.

FIG. 5 is a perspective view of a finished joint and an exploded perspective of a joint about to be made.

FIG. 6 is a longitudinal section through a pipe, fitting and welding ring about to be assembled for welding.

FIG. 7 is a partial section of a joint accomplished.

FIG. 8 is similar to FIG. 7 showing a butt joint accomplished.

FIG. 9 is an enlarged section through part of two lengths of pipe and a fitting illustrating the joint and method of welding the same.

FIG. 10 is a mechano-electric diagram illustrating the circuit for the apparatus and remote inductive heat generator of the present invention.

FIG. 11 is a fragmentary vertical section through FIG. 3 taken substantially along line 11—11 thereof.

Referring to the drawings 10 indicates tubing or pipe made of a thermo plastic material. Fittings of a like material are indicated as 11, the one in FIGS. 1 and 2 is an elbow 12 and the one in FIGS. 5, 7 and 9 is a coupling 13. It will be appreciated that various other fittings of standard shapes such as T's, Y's, caps and plugs made of thermo plastic material although not exemplified, are available in various sizes and diameters. For example, a sink trap made of polypropylene as disclosed, described and claimed in my co-pending application Serial No. 116,397, filed June 12, 1961 is now extensively used in waste and soil lines requiring acid resistant plumbing.

*The sealed joint*

The present invention is concerned with the making of a water tight, leak proof joint 15 at the abutting ends or surfaces of such pipes 10 and/or fittings 11. The joint 15 is a weld at the precise meeting zone of the pipe and/or fitting so as to form a seal at the internal diameter of the same and not at an external zone as previously necessitated in hand welding.

As exemplified in FIGS. 2 and 5 through 9 the ideal welded joint 15 is formed between the abutting ends $e$ of pipe 10 and a shoulder S of a fitting 11 so that the thermo plastic material of each of these members becomes fused thus eliminating the need for welding rod of a like material. Moreover, the molten material prior to fusion runs together and fills in the gap between the surfaces to be welded, thus creating a sealed bead 16 at the internal diameter of the pipes or pipe and fitting. This assures against the formation of any pockets or cracks where sediment, spores and/or contaminating soil can accumulate within a pipe line so welded.

For best results the fittings 11 are constructed with a collar or sleeve portion 18 having an internal diameter 19 comparable to the outside diameter of the outer circumference 20 of the pipe 10 plus a slight clearance so as to telescopically receive the pipe 10. Within the collar 18 the fitting 11 has a center portion 21 having an internal diameter 22 matching that of the inside diameter 23 of the pipe 10. This provides a shoulder in the fitting 11 presenting a surface s comparable to the end e of the pipe 10. In other words, the pipe portion 21 within any fitting 11 has a thickness within the collar 18 substantially comparable to the thickness of the wall of the pipe 10 so that the pipe 10 and portion 21 line up axially end to end with respect to each other.

An inductively heatable ring 25 is disposed between the shoulder S of the pipe portion 21 and the end e of the pipe. As best seen in FIG. 5 the ring 25 is placed in the sleeve 18 before the pipe 10 is inserted therein.

The ring 25 is made of any metal having good inductive pick-up of radio frequency energy. Iron, steel and like material has been found to be most suitable for this purpose. While sufficient inductive heat can be created in any form of ring such as a coil, a flat washer or any like ring adapted to have contact with the surfaces to be welded a ring 25 such as the one shown in the drawings has been found preferable.

In the instant disclosure the ring 25 has an outside diameter 30 comparable to that 20 of the pipe 10 so as to fit into the sleeve 18 in abutting relation to the shoulder S on the fitting 11. For best results the inside diameter 33 of the ring 25 is preferably larger than the inside diameter 23 of the pipe 10 so as to become completely enveloped in the acid resistant material when the weld is formed and completed. As shown in the drawings the inside surface 33 of the ring 25 is best disposed half way between the inside surface 23 and outside surface 20 of the pipe 10. In other words the ring may be said to have a thickness diametrically of approximately one-half that of the thickness of the wall of the pipe 10. The width of the ring 25 is preferably the same as its thickness diametrically.

By this arrangement it will be seen that the ring 25 is disposed co-axially of the fitting 11, its inner pipe portion 21 and the pipe 10 and that the body of the ring is confined well beyond (outside) the internal diameter surfaces 22 and 23 of the pipe and center portion 21 of the fitting, respectively.

*The method of making the joint*

Now then when the ring 25 is heated to a temperature such as to melt the thermo plastic material from which the pipe and fitting is made, the molten material of the pipe and fitting fuses. A slight pressure or movement is then exerted to press the pipe farther into the fitting. In this manner the side walls of the ring 25 pass the respective surfaces e and s of the pipe and fitting. The solid section of the ring 25 thus displaces a portion of the molten plastic material. The displaced molten plastic taking the course of least resistance flows into the space between the surfaces e and s which have now softened sufficiently to become fused with the material displaced by the ring. The gap between the surfaces s and e is thus filled in by the molten material to form the bead 16 having an internal diameter which matches, substantially, the inside diameters 22 and 23 of the pipe and fitting.

The ring 25 is then allowed to cool and the molten plastic sets up and hardens thus forming a homogeneous mass around the body of the ring 25 and between the surfaces e and s welding them together in a solid, sealed leak proof joint 15.

As illustrated in FIG. 6 the ring 25 can be initially molded in place in the fitting 11 at the time the fitting is made. This eliminates the need for separate rings on an installation since the mechanic need only insert the end e of the pipe 10 into the sleeve portion 18 of the fitting 11, apply heat to the ring 25, press the pipe inwardly slightly when the material softens, then allow the ring to cool and the molten plastic to set up to form a joint 15 as illustrated in FIG. 7.

Referring to FIG. 8 it will be noted that a butt joint 50 can be formed between the ends e-e' of two lengths of pipe 10 and 10'. This is accomplished in the same manner as explained above by placing the ring 25 between the ends e and e' of the two pipes. The ring 25, having an outer diameter comparable to that 20-20' of the pipes, will line up with the two lengths of pipe 10 and 10' when they are aligned by means of a strap or band B adapted to circumscribe them. When the ring 25, so disposed, is heated and the plastic material at the pipe ends e and e' becomes molten the two pipes can be pressed toward each other slightly to embed the body of the ring partially into each end of the pipe. The pipes and ring being confined within the band or strap B confines the molten material and therefore the molten material displaced by the body of the ring 25 oozes diametrically inwardly of the weld to fill up the space between the ends e and e' to form a bead 16' which completely fills the gap between them. The ends e and e' thus become fused together upon cooling of the ring 25 to form a weld joint 50 by which the two pipes 10 and 10' become as one continuous length of pipe.

In each weld or joint 15 and 50 as explained above it will be noted that the ring 25 is covered on its inner side by the thermo plastic material. Thus it will be appreciated that the metal ring 25 is embedded in the acid resistant plastic and thereby shielded against exposure to the acids which are to flow through the pipes or pipes and fittings.

*The apparatus for making the joint*

The apparatus by which the joint 15 and/or 50 is to be made includes an induction generator 60 by which the ring 25 can be heated remotely. The induction generator 60 includes a radio frequency oscillator 61 and a concentrating loop or band 62 associated with a transformer 63 encased in a hand tool 64 and connected by a cable 65 to the oscillator 61.

The hand tool 64 for purposes of this disclosure is best identified as a remote head 66 which, as illustrated in FIGS. 1 and 2 makes it feasible to place and attach the concentrating loop or band 62 to various types and sizes of plastic pipes and fittings to thereby induce heat into the ring 25 for making the weld.

The remote head 66 as explained above has a transformer 63 confined therein. The primary winding of this transformer 63 is a coil 67 of one eighth inch coated wire having one end coming from the grid tap 68 in the oscillator 61 and its other end connected to the plate lead 69 thereof via a co-axial cable 65. The coil 67 preferably has 30 turns confined within a split copper secondary 70 of the transformer 63. The entire transformer 63 is confined within a casing 71 made of non-conductive material and having a portion 72 thereof which is substantially cylindrical in shape to receive and support the transformer 63 concentrically thereof.

The primary or coil 67 is encased in a stiff cloth cover 73 set upon non-conductive spacer blocks 74 in the form of rings which surround the primary winding or coil 67 and support the same in concentric spaced relation to the split copper secondary 70 of the transformer 63. The copper secondary 70 is substantially cylindrical in form except for a gap or space 75 at its upper side relative to the casing 71 for reasons later to be made apparent. The partially cylindrical secondary 70 is surrounded by circular spacers 76 by which the same is held in concentric relation to the cylindrical portion 72 of the casing 71. As shown in FIG. 3 the coil 67 is grounded as at 87 to the copper secondary 70 to provide a grid coupling coil 88 in the last ten turns of the primary winding of the transformer 63.

The casing 71 has a finger grip handle 77 formed on its upper side and extending rearwardly of the casing in parallel relation to the cylindrical portion 72 thereof.

The fore end of the casing 71 is a flat wall 78 having an access panel 79 mounted therein for covering the cylindrical portion 72 and for permitting access to the transformer when necessary for repairs and installation thereof.

The handle 77 and fore wall 78 of the casing merge with each other to provide a pillar 80 at the upper, fore corner of the remote head 66. The pillar 80 provides a mounting for the loop or band 62 and has means 81 formed thereon for facilitating attachment of the loop 62 to pipes and fittings.

The means 81 includes a pair of electrodes 82 and 83 separated from each other by suitable insulation 84. These electrodes 82 and 83 are preferably built into the pillar 80 which is of the same non-conductive material as the casing 71.

As illustrated in FIGS. 3, 10 and 11 the electrode 82 is lower and forward relative to the electrode 83 which is above and rearwardly disposed. Each of these electrodes is L shaped and inverted so that each has a vertical portion extending down into the cylindrical portion 72 of the casing 71 for connection to the split copper secondary 70 of the transformer 63. As best seen in FIG. 11 the electrode 82 has its vertical leg 85 soldered to the copper secondary 70 on one side of the gap 75 thereof and the vertical leg 86 of the other electrode 83 is soldered to the secondary 70 on the other side of the gap 75. This in effect is to connect each end of the copper secondary to a separate electrode 82 and 83 respectively so that secondary current induced into the split copper plate 70 is impressed upon the electrodes 82 and 83 when they are electrically connected.

The electrodes 82 and 83 are connected by means 81 to the ends of the loop 62 which is a metal band B for setting up an electrical field in any metallic element disposed within the loop. It should here be noted that no shock can be obtained from the loop. Neither is there any harmful effect experienced when a person's hand is placed within the orbit of the loop. Only a metal object or objects attract the induced voltage from the transformer.

The means 81 consists of a binding post 89 on the horizontal foot 90 of the L-shaped lower electrode 82 and a toggle or over center clamp 91 on the horizontal foot 92 of the L-shaped upper electrode 83.

The binding post 89 has a recessed block 93 formed below the foot portion 90 of electrode 82 to receive a terminal 94 on one end of the loop 62. A set screw 95 threaded upwardly through the block 93 secures the terminal 94 to the electrode 82 thus providing the loop with one end fixed to one side of the secondary 70 of the transformer. In this manner it will be appreciated that various sizes of loops can be interchanged with the transformer to suit and fit various diameters of pipe and fittings to be welded.

The toggle or over center clamp 91 comprises a lever 96 pivotally mounted on a pin or shank of a bolt 97 extending between spaced ears 98 bent up from the forwardly projecting foot 92 of the upper electrode 83. This lever 96 has a cam portion 99 which is eccentric to the pin 97 and spaced from the upper surface of the foot 92 to receive the other terminal end 100 of the loop 62 when the lever 96 is swung upwardly (counterclockwise FIG. 3, clockwise FIG. 10). This renders the terminal end 100 of the loop removable so that the loop 62 can be opened up for placement around a pipe or a fitting as illustrated in FIG. 2. When the removable terminal 100 is slipped into the toggle clamp 91 and the lever 96 thereof pressed down upon the top of the top of the handle 77 the cam 99 binds the terminal 100 to the electrode 83 and the induction of heat into the sealing ring 25 possible.

Once the pipe and fitting have been brought together for welding with a metal ring 25 disposed between the surfaces to be joined and the loop 62 placed completely around the zone to be welded as shown in FIG. 1 current from the transformer 63 flowing through the loop 62 will set up a voltage within the metal ring 25.

In order to energize the transformer 63 it becomes necessary for the person operating the tool 64 to close a switch 102 to turn on the radio frequency oscillator 61.

The switch 102 is mounted within the tool 64 and at the base end 103 of a push button 105 conveniently mounted on one side of the pillar 80 for thumb actuation by the thumb of the hand of the person holding the tool 64 by its handle 77 as shown in FIGS. 1 and 2.

As best seen in FIG. 11 the switch 102 is connected by a two wire cord 106 to the oscillator, the cord 106 extending through the handle 77 (FIG. 3) and out in a common insulated flexible cable 107 through which the shielded co-axial cable 65 also extends back to the oscillator 61.

Now when the push button 105 is depressed to close the switch 102 the coil 67 of the transformer 63 is energized to induce current into the copper secondary 70 and thence into the loop 62. No heat occurs until metal having good inductive pick up is disposed within the orbit of the loop 62. However with the loop 62 surrounding the zone of the iron or steel ring 25 between surfaces $e$–$e'$ and/or $e$–$s$ of thermo plastic material such ring begins to heat up immediately. This is caused by induced voltage building up within the ring 25. The ring 25 is in effect a shorted turn within the orbit of the loop 62 with the result that the induced voltage tries to flow around the ring but since it cannot go anywhere outside the annular metal body of the ring a great degree of heat quickly develops in the ring 25. Tests have proven a development of approximately 800° F. in the ring 25 within two minutes plus by the arrangement and phenomenon afforded by the apparatus of the present invention. Polypropylene usually requires a temperature of 400° F. and over in order to accomplish a weld. A weld on 1½ inch and 2 inch diameter polypropylene pipe and fittings has been accomplished in 30 seconds at 440° to 450° F. To create the same temperature for welding 3 inch and 4 inch diameter pipe and fittings took one minute 12 seconds. Contrasting this with a hand weld which usually takes an experienced man about 23 minutes, it will be appreciated that the apparatus, method and weld of the instant application is a great labor saver. Moreover, since all hand welds have to be pressure tested because they are made on the outside and not within the pipe as in the present method it will be further appreciated that faulty welds are greatly eliminated.

Furthermore the joints 15 and 50 of the instant invention resulting in a bead 16 which closes the gap between pipe ends $e$–$e'$ and/or surfaces $s$ there is a more perfect weld created and one that minimizes any surface friction, on the flow or clogging or snagging of objects carried thereby.

Should a particular joint made by the present method and apparatus prove faulty the same steps and heat induction induced upon the ring 25 can be employed to melt the weld, remove the previously welded pipes and fittings and a new joint formed therein. In some cases it requires only a reheating of the ring 25 to melt the plastic around it to correct or establish a sealed joint.

While I have described my new apparatus for making the joints for thermo plastic pipe and fittings thereof in specific detail it will be appreciated by those skilled in the art that the joint, steps and apparatus may be varied, altered and/or modified without departing from the spirit of my invention therein. I therefore desire to avail myself of all variations, alterations and/or modifications as may fairly come within the purview of the appended claims.

What I claim as new and desire to protect by Letters Patent is:

1. In combination with a hand tool having a dielectric casing confining a transformer and a thumb actuated switch for connecting the same by way of a flexible cable to a high frequency generator remote therefrom and the secondary winding of which transformer has a pair of electrodes spaced from each other on one end of such casing; a loop for surrounding a metallic element between separate thermo plastic parts for impressing inductive heat to such metallic element, comprising;

(1) a flexible metallic band having one end thereof electrically connected to a first one of said pair of electrodes leaving the other end of said band free for wrapping of said band around such thermo plastic parts; and (2) a thumb actuated clamp mounted on such casing in the region of said switch and the second one of said electrodes for receiving the free end of said band and for clampingly securing the latter to said second electrode.

2. The device in accordance with claim 1 in which said thumb actuated clamp comprises a cam lever mounted on said casing adjacent said second one of said electrodes for receiving the free end of said band and for cammingly engaging the same for releasably urging the free end of said band into electrical contact with said second electrode.

3. In cambination with a hand tool having a dielectric casing confining a transformer, the primary winding of which is connected by a flexible cable to a high frequency generator and the secondary winding of which has a pair of electrodes spaced from each other on one end of such casing; a loop for surrounding an endless metallic element disposed between separate thermo plastic parts for impressing heat by induction to such metallic element to weld the thermo plastic parts engaged thereby and comprising;

(1) a flexible metallic band having one end thereof electrically connected to a first one of said pair of electrodes whereby said band is free for the wrapping thereof around such thermo plastic parts; and (2) means connected to the second one of said electrodes for releasably securing the other end of said band thereto with said band circumscribing such thermo plastic parts in the region of the engagement thereof with said metallic element.

4. The device in accordance with claim 3 in which said means for releasably securing the other end of said band to said second one of said electrodes comprises a thumb actuated toggle lever pivotally mounted on such casing.

5. The device in accordance with claim 4 in which said thumb actuated toggle lever has a cam surface adjacent said second one of said electrodes, and movable toward and from the latter for receiving the free end of said band and for cammingly engaging the same for releasably urging the free end of said band into electrical contact with said second electrode.

6. In a device for welding a joint between the ends of thermo plastic pipe and fittings by impressing inductive heat to a conductive ring between the ends of thermo plastic pipe and fittings including a hand tool having a dielectric casing confining an impedance transformer, the primary winding of which is connected by a thumb actuated switch adjacent a handle on such casing to a flexible cable from the oscillator circuit of a high frequency generator and the secondary winding of which transformer has a pair of electrodes spaced from each other at one end of such casing adjacent said thumb actuated switch; the combination therewith of a wrap around loop for circumscribing such thermo plastic pipe and fittings comprising;

(1) a flexible metal band;

(2) means for permanently connecting one end of said band to one of said electrodes remote from said thumb actuated switch; and (3) means mounted on said casing adjacent said thumb actuated switch and to the other one of said electrodes for releasably securing the other end of said band thereto with said band in circumscribing relation to such pipe and fitting in the region of the conductive ring engaging the ends of such pipe and fitting.

7. The device in accordance with claim 6 in which said means for releasably securing the other end of said band to said other one of said electrodes comprises an over center toggle clamp pivotally mounted on said casing in close proximity to said last named electrode and cooperating therewith for receiving and binding said other end of said band therebetween.

8. The device in accordance with claim 7 in which said over center toggle clamp comprises a lever pivotally mounted on said casing and having a cam facing said other one of said electrodes for movement toward and from the latter upon thumb actuation of said lever for receiving the free end of said band and for cammingly engaging and binding the free end of said band into electrical contact with said other one of said electrodes.

References Cited by the Examiner

UNITED STATES PATENTS

| 2,005,189 | 6/1935 | Herr | 285—21 |
|---|---|---|---|
| 2,642,911 | 6/1953 | De Shazor | 156—372 |
| 2,732,229 | 1/1956 | Gaum | 285—21 |
| 2,739,829 | 3/1956 | Pedlow et al. | 285—423 X |
| 2,797,288 | 6/1957 | Kiemele et al. | 219—9.5 |
| 2,801,316 | 7/1957 | Hughes | 219—9.5 |
| 2,820,875 | 1/1958 | Werych et al. | 219—10.75 |
| 2,933,428 | 4/1960 | Mueller | 285—21 X |
| 2,961,363 | 11/1960 | Lowes | 285—21 X |
| 3,049,465 | 8/1962 | Wilkens | 156—275 |
| 3,061,503 | 10/1962 | Gould et al. | 156—275 |
| 3,094,452 | 6/1963 | Von Riegen et al. | 285—21 X |

FOREIGN PATENTS 650,184   2/1951   Great Britain.

RICHARD M. WOOD, *Primary Examiner.*

CARL W. TOMLIN, *Examiner.*

D. W. AROLA, L. H. BENDER, *Assistant Examiners.*